3,410,878
PREPARATION OF QUINOL ETHERS
Hans-Dieter Becker, Schenectady, N.Y., assignor to General Electric Company, a corporation of New York
No Drawing. Filed Apr. 1, 1964, Ser. No. 356,653
16 Claims. (Cl. 260—396)

ABSTRACT OF THE DISCLOSURE

The free radical, obtained by reacting active manganese dioxide with 2,4,6-trisubstituted hindered phenols, is reacted with a monohydric phenol, in the presence of the active manganese dioxide, to produce quinol ethers in a single step reaction. The quinol ethers so produced are a convenient source of free radicals when heated or they can be used as polymerization inhibitors for ethylenically unsaturated monomers.

---

This invention relates to a novel process for producing quinol ethers and to certain of the novel quinol ethers produced thereby. More specifically, this invention relates to the preparation of quinol ethers by converting 2,4,6-tri-substituted hindered phenols to a free radical with active manganese dioxide and reacting the free radicals with a monohydric phenol to produce the quinol ethers, and to the novel quinol ethers so produced.

The term "hindered phenols" or "crypto phenols" is used in the literature to designate those phenols having such large bulky groups in the two ortho positions that they prevent or hinder the phenolic hydroxyl group from participating in many of the reactions typical of phenols which do not contain such substituents. Typical of the substituents which may produce these so-called hindered or crypto phenols are those alkyl groups having a tertiary α-carbon atom, e.g. t-butyl, t-amyl, 1,1-diethylpropyl, 1-methyl-1-phenylethyl, 1,1-dimethylbutyl, 1,1 - dimethylpentyl, 1,1-dimethylhexyl, etc.; and aryl groups, e.g., phenyl, tolyl, xylyl, mesityl, duryl, ethylphenyl, chlorophenyl, naphthyl, etc. Hay, in J. Polymer Sci., 58, 581 (1962) discloses that these hindered phenols are oxidized to diphenoquinones, whereas other phenols form polyphenylene ethers. If in addition to having these substituents in the two ortho positions there is also a large bulky group or alkoxy or aryloxy group in the para position, these hindered phenols are capable of being oxidized in solution in an inert solvent to a stable free radical. By the term "stable free radical" is meant that the radical will exist in solution in an inert solvent in the absence of oxygen or other reactive materials for a period sufficient to be detected. Many stable free radicals can exist for long periods of time, i.e., at least one hour, and some even for days and some even are able to exist in the solid state. The stable free radicals from such phenols will not react with the phenol from which they are made. In solution, they are highly colored so that their presence is visually detectable. Müller, Ley and Schlechte describe in Chem. Ber., 90, 2660 (1957) that the stable 2,4,6-tri-t-butylphenoxy radical will react with various mono- and di-t-butylphenols, trihalophenols, β-naphthol, resorcinol and phloroglucinol to produce quinol ethers. These compounds have the structure

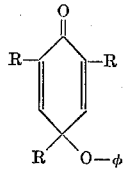

where R is the substituent on the hindered phenol forming the free radical and φ—O— is the residue of the phenol which has reacted with the free radical.

In carrying out their reaction, 2,4,6-tri-t-butylphenol dissolved in benzene is oxidized to the free radical using an aqueous alkaline solution of potassium ferricyanide. The organic solution is separated from the aqueous solution and washed well with water to remove any of the oxidizing agent which might be dissolved in the organic layer. The 2,4,6-tri-t-butylphenoxy radical produces a very deep blue color in the organic layer. This dark blue solution is titrated with a solution of the second phenol until the color disappears, indicating that there is no more free 2,4,6-tri-t-butylphenoxy radical left in solution.

At this point, two mols of the 2,4,6-tri-t-butylphenoxy radical have reacted with 1 mol of the phenol to produce an equimolar mixture of the quinol ether and 2,4,6-tri-t-butylphenol, the starting material. In other words, only 50% of the initial 2,4,6-tri-t-butylphenol has been converted to the quinol ether even if the reaction is quantitative. In order to increase the yield of the quinol ether, it is necessary to reoxidize the 2,4,6-t-butylphenol to the 2,4,-6-tri-t-butylphenoxy radical by again treating the solution with additional aqueous alkaline potassium ferricyanide, separating the aqueous layer and washing the organic layer until free of oxidizing agent, and then titrating with an additional amount of the phenol. Even if the reaction is quantitative, only 75% of the 2,4,6-tri-t-butylphenol has been converted to the quinol ether. This whole procedure must be repeated at least four times in order to actually obtain reasonable yields of the quinol ether, i.e., better than 75% of theory. The reason that the reaction of the free radical and the phenol must be carried out in the absence of an oxidizing agent is because the phenol which is being reacted with the 2,4,6-tri-t-butylphenoxy radical is oxidized by the oxidizing agent to a mixture of products which are undesirable. This process, therefore, is tedious and time-consuming. Furthermore, if the quinol ether is a liquid, it is impossible to separate it from the tri-t-butylphenol. If pure quinol ethers are desired, they must be solids which can be purified by recrystallization.

I have now found that the reaction between the stable phenoxy radical and a phenol can be carried out completely as a one-step process in the presence of an oxidizing agent if the oxidizing agent used is an active form of manganese dioxide. Such a material is well known and described, for example, by Attenburrow et al., in J. Chem. Soc., 1952, 1094; and by Evans, in Quart. Rev. (London) 13, 61 (1959). It is a finely divided manganese dioxide formed by precipitation with aqueous alkali from an aqueous solution of a manganese salt and potassium permanganate. This form of manganese dioxide has greater oxidizing activity than commercially available manganese dioxide.

I have further determined that in addition to using 2,4,6-tri-t-butylphenol, I may use other 2,4,6-tri-substituted phenols where each of these substituents is a large bulky group, for example, a $C_{4-8}$ t-alkyl group, e.g., t-butyl, t-amyl, 1,1-diethylpropyl, 1-methyl-1-ethylpropyl, 1,1-dimethylbutyl, 1,1-dimethylpentyl, 1,1-dimethylhexyl, etc., an aryl group, e.g., phenyl, $C_{1-8}$ alkyl-substituted phenyl, e.g., tolyl, ethylphenyl, propylphenyl, butylphenyl, octylphenyl, exylyl, diethylphenyl, mesityl, duryl, etc., chlorophenyl, e.g., mono-, di-, tri-, tetra-, and pentachlorophenyl, naphthyl, etc. In addition, the substituent in the para position may be $C_{1-8}$ alkoxy, phenoxy, chlorophenoxy and $C_{1-8}$ alkylsubstituted phenoxy. Typical examples of hindered phenols which I may use in addition to 2,4,6-tri-t-butylphenol ore 2,4,6-tri-t-amylphenol, 2,4,6-triphenylphenol, 2,4,6-tritolyphenol, 2,4,6-trixylylphenol, 2,4,6-tri-(2,4,6 - trichlorophenyl)phenol, 2,4,6-tri-(1,1-dimethylpropyl)phenol, 2,4,6 - tri - (1,1 - dimethylhexyl) phenol, 2,6-di-t-amyl-4-phenylphenol, 2,6-di-t-butyl-4-methoxy-phenol, 2,6-di-t-amyl-4-phenoxyphenol, 2,6-di-t-butyl-4-phenylphenol, 4-t-amyl-2,6-diphenylphenol, 2,6-di-t-butyl - 4 - pentachlorophenoxyphenol, 2,6-di-t-butyl-4-xylyloxyphenol, 4-t-butyl-2,6-diphenylphenol, 4-t-amyl-2-t-butyl-6-phenylphenol, 2-t-amyl-t-butyl-4-phenylphenol, etc. Such phenols will hereinafter for the sake of brevity be referred to as tri-substituted hindered phenols.

When any of the above tri-substituted hindered phenols are dissolved in an inert solvent, for example, a liquid organic solvent such as benzene, toluene, xylene, heptane, octane, petroleum ether, chloroform, carbon tetrachloride, ethers, e.g., diethyl ether, ketones, e.g., acetone, etc., and activated manganese dioxide is added, although the manganese dioxide does not dissolve, it is capable of oxidizing these tri-substituted hindered phenols to stable free radicals. Preferably, an inert gas atmosphere is maintained over the solution to prevent oxygen from the air from reacting with the stable, free radical to form a peroxide. On shaking or stirring the reaction mixture, the blue color of the stable free radical immediately develops. The second phenol is added in small portions and enough time allowed for the added phenol to dissolve and react. At first, the color of the free radical may disappear as the added phenol reacts with the free radical, but the characteristic color of the free radical again reappears if insufficient phenol was added to completely convert the tri-substituted phenol to the quinol ether. Additional phenol is added, again in a small portion and this alternate adding and permitting the reaction to proceed until the color of the free radical again reappears is repeated until the color of the free radical fails to reappear. Preferably the amount of phenol added at one time should be small enough that the color of the free radical will not disappear until the required amount of phenol is added. If desired, the added phenol may be added as a solution in an inert solvent and the reaction carried out similar to a titration using the color of the free radical as an indicator. In any case, it is found that the color of the free radical no longer appears after one mol of phenol is added for each mol of the tri-substituted hindered phenol initially used. Since the reaction proceeds so rapidly at room temperature, there is no need to carry out the reaction at higher or lower temperatures although it can be done if desired.

The active manganese dioxide should be used in sufficient quantity that it is capable of oxidizing all of the initially added tri-substituted hindered phenol as well as all of the tri-substituted hindered phenol produced in the reaction. I have found that using an excess of manganese dioxide does not cause any disadvantage and insures high yields. I usually use 15 to 30 mols of manganese dioxide for each mol of tri-substituted hindered phenol initially present. After the reaction, the manganese dioxide is readily filtered from the reaction mixture and may be re-used as long as it is capable of oxidizing the tri-substituted phenol to the free radical. The quinol ether is isolated by evaporation of the solvent from the filtrate. Highest yields and purity of product of the quinol ether are obtained if the evaporation is carried out at relatively low temperatures, for example, at room temperature under vacuum. For this reason, I prefer to use inert solvents that can readily evaporated at the ambient temperature under vacuum. Since the actual solvent used does not affect the reaction as long as it will dissolve the phenolic reactants but will not enter into the reaction, the actual solvent used is not critical and its choice is based on convenience, cost and availability. Aromatic hydrocarbons, e.g., benzene, toluene, xylene, ethylbenzene, etc., make excellent solvents to use. Benzene is preferred since it is easiest to evaporate at ambient temperature under vacuum but any inert solvent may be used.

Any monohydric phenol may be reacted with the solution of free radicals to produce quinol ethers, except those hindered phenols having a large bulky group in each of the two ortho positions. Also, those phenols which have substituents other than halogen in both ortho positions produce quinol ethers which are in equilibrium in solution with the phenol and free radical from which they are prepared. This means that it is quite difficult to prepare the quinol ethers and isolate them in pure form in good yields. Phenols having bromine or iodine in the ortho positions produce quinol ethers which tend to be unstable in the solid form even after isolation. On the other hand, if the phenols which are reacted with the free radical are either unsubstituted in one of the two ortho positions, i.e., have hydrogen in one of the two ortho positions, or have a chlorine substituent in one of the two ortho positions, then the quinol ethers formed are very stable at room temperature and are readily isolated in high purity and good yield from their solutions and are stable in the solid state. Therefore, the phenols which I prefer to react with the free radical are those phenols which have hydrogen or chlorine in one of the ortho positions. The other ortho position and the meta and para positions may be substituted or unsubstituted. Substituents in these positions do not affect the stability of the quinol ethers and furthermore do not interfere with the ability of the phenolic hydroxyl group of the phenol to react with the free radical to form the quinol ethers. Therefore, the substituents in the one ortho position and the meta and para positions may be any of those substituents capable of being introduced into the phenyl nucleus. Generally, phenols with meta substituents other than halogen or methyl are difficult to obtain; therefore, I generally prefer to use phenols which, if substituted, have the substituents only in one ortho position and/or the para position unless the meta substituent is a chlorine or methyl group. The choice of the actual substituents is of course dependent on the desired quinol ether. Generally, these substituents are chlorine, $C_{1-8}$ alkyl or alkoxy, aryl aryloxy, $C_{7-15}$ aralkyl and aralkoxy, chloroaryl and chloroaryloxy, $C_{1-8}$ alkyl-substituted aryl and aryloxy, etc., but widely diverse substituents such as arylthio, arylcarbonyloxy, aralkoxy, etc., may be present, if desired. Typical of such phenols are, by way of example, phenol itself, β-naphthol, 2-chlorophenol, 2,4-dichlorophenol, 2,6-dichlorophenol, 2,4,6-trichlorophenol, 2,3,4,6-tetrachlorophenol, pentachlorophenol, o-cresol, m-cresol, p-cresol, 4-ethylphenol, the 4-butylphenols (e.g. primary, secondary and tertiary butylphenol), 2,4-xylenol, 2,3-xylenol, 3,4-xylenol, 2,3,4-trimethylphenol, 3,4,5 - trimethylphenol, 4-t-butylphenol, 2,4 - di-t-butylphenol, 2,5-di-t-butyl-4-methoxyphenol, 4-octylphenol, 4-octadecylphenol, 4-cyclohexylphenol, 4-pentachlorophenylphenol, 4-phenylphenol, 4-tolylphenol, 4-benzylphenol, 4-xylylphenol, 4 - methoxyphenol, 4 - phenoxyphenol, 4-(phenylthio)phenol, 4-(2-carboxyethylphenyl)phenol, 4-benzoyloxyphenol, 4-benzoxyphenol, 2-chloro-4-methylphenol, 2,6-dichloro-4-methoxyphenol, etc.

The following examples are given by way of illustration and not by way of limitation. In all of the examples, parts and percentages are by weight, unless otherwise stated.

Example 1

The active manganese dioxide is prepared by dissolving 1110 grams of manganese sulfate tetrahydrate in 1500 ml. of water and this solution is added simultaneously with 1710 ml. of 40% aqueous solution of sodium hydroxide, during a one-hour period to a hot, stirred solution of 960 grams of potassium permanganate in 6 liters of water. The manganese dioxide forms as a fine brown precipitate. The mixture is stirred one hour and then centrifuged. The precipitated manganese dioxide is washed until the washings are colorless. The manganese dioxide is dried at 100–120° C. and ground to a fine powder.

Example 2

To a suspension of 12 g. of the active manganese dioxide from Example 1, in 100 ml. of benzene, 2.62 g. of 2,4,6-tri-t-butylphenol was added and the mixture shaken in a nitrogen atmosphere for 1 minute, by which time the solution had become deep blue, showing the presence of the 2,4,6-tri-t-butylphenoxy radical. Over a period of 30 minutes, 1 gram of phenol was added in 5 equal portions with vigorous shaking after each addition. The blue color of the free radical disappeared after the addition of the last portion of phenol. After filtering off the manganese dioxide, the yellow filtrate was evaporated at room temperature under vacuum yielding 2.75 g. (73% yield) of yellow oil of the quinol ether, 4-phenoxy-2,4,6-tri-t-butyl-2,5 - cyclohexadiene-1-one. Elemental analysis of the yellow oil showed that it contained 82.49% carbon and 9.05% hydrogen, which agrees with the theoretical value for this compound of 82.41% carbon and 9.42% hydrogen. Thermoelectric osmotic measurement of the molecular weight of a solution of the product in dioxane gave a value of 336 which agrees within experimental error with the theoretical value of 378.53 for the quinol ether, thus showing that the product was not a dimer or higher polymer.

Example 3

To a suspension of 2.6 g. of active manganese dioxide in 50 ml. of benzene, 0.262 g. of 2,4,6-tri-t-butylphenol was added and the suspension shaken under nitrogen for 1 minute forming a deep blue colored solution of the 2,4,6-tri-t-butylphenoxy radical. To this suspension was added 0.15 g. of 4-t-butylphenol in 3 portions with shaking for about 1 minute between additions. After the last portion was added, the blue color of the free radical had completely disappeared. The manganese dioxide was removed by filtration and the yellow filtrate evaporated at room temperature under vacuum. The yellow residue crystallized yielding 0.35 g. (85% yield) of the quinol ether, 4-(4-t-butylphenoxy)-2,4,6-tri-t-butyl - 2,5 - cyclohexadiene-1-one, which was identified by its melting point of 91–92° C., which is identical with that reported in the literature. Its infrared spectrum in carbon tetrachloride was identical with a sample prepared by the multiple stage process described in the literature using aqueous alkaline potassium ferricyanide.

Example 4

A solution of the free 2,4,6-tri-t-butylphenoxy radical was prepared by adding 0.524 g. of 2,4,6-tri-t-butylphenol to a suspension of 5.2 g. of active manganese dioxide in 100 ml. of benzene. After shaking for 1 minute, 0.40 g. of 2,4,6-trichlorophenol was added in 4 portions, shaking for 1 minute after each addition. After the last addition, the solution still showed a slight greenish color, indicating a small amount of the blue free radical was still present. A further addition of 0.02 g. of 2,4,6-trichlorophenol turned the greenish colored solution to yellow. The manganese dioxide was filtered from the solution leaving a very slightly greenish colored filtrate. The filtrate was evaporated at room temperature under vacuum yielding 0.85 g. (93% yield) of the slightly yellowish-greenish colored crystalline quinol ether, 4-(2,4,6-trichlorophenoxy)-2,4,6-tri-t-butyl-2,5-cyclohexadiene-1-one, having a melting point of 122–123° C. After recrystallization from hot ethanol, the melting point was 127–129° C. Elemental analysis showed that the product had 62.94% carbon, 6.95% hydrogen, and 23.40% chlorine, which agrees very well with the theoretical analysis of 62.96% carbon, 6.82% hydrogen and 23.23% chlorine.

Example 5

When Example 4 was repeated but using an equivalent amount of pentachlorophenol in place of the 2,4,6-trichlorophenol, a yield of 0.95 g. (90% of theory) of greenish yellow crystals of the quinol ether, 4-(pentachlorophenoxy)-2,4,6-tri-t-butyl - 2,5 - cyclohexadiene-1-one was obtained, having a melting point of 157–158° C., after recrystallization from a hot mixture of ether and ethanol. Elemental analysis showed that the product had 54.51% carbon, 5.57% hydrogen and 33.44% chlorine, which agreed with the theoretical analysis of 54.73% carbon, 5.55% hydrogen and 33.65% chlorine.

Example 6

The quinol ether, 4-[-(phenylthio)phenoxy]-2,4,6-tri-t-butyl-2,5-cyclohexadiene-1-one was prepared in the same manner as described in Example 4, but using 0.262 g. of 2,4,6-tri-t-butylphenol and 0.202 g. of p-hydroxydiphenylthioether[-4-(phenylthio)phenol]. The light greenish colored oil obtained after evaporation of the solvent from the filtrate crystallized after treatment with a little ethanol, yielding 0.40 g. (86% of theory) of the yellowish crystals of the quinol ether, having a melting point of 112–113° C. Elemental analysis showed that the product had 77.85% carbon, 8.57% hydrogen and 7.10% sulfur, agreeing very well with the theoretical analysis of 77.89% carbon, 8.28% hydrogen and 6.91% sulfur.

Example 7

The quinol ether, 4-(4-methoxyphenoxy)-2,4,6-tri-t-butyl-2,5-cyclohexadiene-1-one was prepared as described in Example 4, using 0.524 g. of 2,4,6-tri-t-butylphenol and 0.250 g. of p-methoxyphenol. Evaporation of the filtrate yielded 0.70 g. (91% of theory) of the quinol ether as a green oil. Upon treatment with a little ethanol the oil formed yellow crystals having a melting point of 74–75° C. After recrystallization of the crystals from ether and the addition of ethanol, the melting point was raised to 77–78° C. Elemental analysis showed that the product contained 78.31% carbon, and 9.67% hydrogen, which agrees very well with the theoretical values of 78.08% carbon and 9.44% hydrogen.

Example 8

The quinol ether, 4-(4-benzoyloxyphenoxy)-2,4,6-tri-t-butyl-2,5-cyclohexadiene-1-one was prepared by the method described in Example 4, using 0.262 g. of 2,4,6-tri-t-butylphenol and 0.214 g. of the monobenzoate of hydroquinone (4-benzoyloxyphenol). After evaporation of the solvent from the filtrate, a yield of 0.415 g. (87% of theory) of the quinol ether was obtained as yellow needles having a melting point of 132–133° C. Recrystallization from a warm ether solution by addition of ethanol caused no raising of the melting point. Elemental analysis of the quinol ether showed that it contained 78.25% carbon, and 8.08% hydrogen, which agrees very well with the theoretical values of 78.45% carbon and 8.07% hydrogen.

Example 9

The quinol ether, 4-(4-benzyloxyphenoxy)-2,4,6-tri-t-butyl-2,5-cyclohexadiene-1-one was prepared using the method described in Example 4, using 0.524 g. of 2,4,6-tri-t-butylphenol and 0.20 g. of the monobenzyl ether of hydroquinone (4-benzyloxyphenol). After evaporation of the solvent from the filtrate, a greenish colored oil was obtained which rapidly crystallized upon the addition of a little ethanol, yielding 0.655 g. (71%) of the quinol ether as slightly yellow crystals. After recrystallization from ether by adding ethanol, the melting point was 104–105° C. Elemental analysis showed the product had 80.89% carbon and 8.96% hydrogen, which agrees with the theoretical values of 80.83% carbon and 8.75% hydrogen.

Example 10

To a suspension of 13 g. of active manganese dioxide in 125 ml. of benzene, 1.31 g. of 2,4,6-tri-tertiary butylphenol was added. After shaking for approximately 1 minute to produce the deep blue color of the free radical, 0.930 g. of p-phenoxyphenol was added in 4 portions, shaking for approximately 1 minute between additions. After the last addition, no blue color of the free radical was present. After filtering the manganese dioxide and evaporation of the solvent, 1.85 g. (82% yield) of the quinol ether, 4-(4-phenoxyphenoxy)-2,4,6-tri-t-butyl-2,5-cyclohexadiene-1-one, was obtained as a yellow colored oil. Elemental analysis showed that it contained 80.50% carbon, 8.71% hydrogen, which agrees with the theoretical analysis of 80.68% carbon and 8.59% hydrogen. Its molecular weight, determined as in Example 2, was 436, which agrees with the theoretical value of 446.60 within experimental error.

All of the quinol ethers obtained in Examples 2 through 10 have infrared spectra which exhibit double peaks in the frequency region of 1630 to 1660 cm.$^{-1}$, which is typical for compounds with a quinolid structure.

The quinol ethers of this invention have a wide variety of uses as intermediates in preparing other compounds or as a stable source of readily produced free radicals. For example, these quinol ethers when heated above their melting point, or to temperatures above 50° C. in solution, dissociate into free radicals and therefore serve as a convenient source of free radicals which develop on application of heat. Those quinol ethers having a tertiary alkyl group in the 4-position are readily dealkylated in the presence of acids to produce the corresponding 4-substituted phenols. For example, the quinol ether of Example 2, 4-phenoxy-2,4,6-tri-t-butyl-2,5-cyclohexadiene-1-one, may be dealkylated to produce 2,6-tri-t-butyl-4-phenoxyphenol. The quinol ethers are also stabilizers for monomeric ethylenic unsaturated compounds and stabilize such compositions against polymerizing, even when heated. For example, when the quinol ethers of this invention are dissolved in monomeric styrene, the styrene may be heated for many hours at 60° C. without the styrene polymerizing, whereas styrene not containing the quinol ethers readily becomes viscous and then solid under such conditions. Other uses for these quinol ethers will be readily recognized by those skilled in the art.

Obviously, other modifications and variations of the present invention are possible in light of the above teachings. Therefore, it is to be understood that changes may be made in the particular embodiments of the invention described which are within the full intended scope of the invention as defined by the appended claims.

What I claim as new and desire to secure by Letters Patent of the United States is:

1. The process of making quinol ethers which comprises reacting (a) a solution of a 2,4,6-tri-substituted phenol wherein the substitutents in the 2- and 6-positions are selected from the group consisting of phenyl, chlorophenyl, $C_{1-8}$ alkyl substituted phenyl, and $C_{4-8}$ alkyl groups having a tertiary α-carbon atom, and the substituents in the 4-position are the same as those in the 2- and 6-positions and in addition $C_{1-8}$ alkoxy, phenoxy, chlorophenoxy, and $C_{1-8}$ alkyl-substituted phenoxy, with (b) active manganese dioxide to produce a solution of the stable free radical of the phenol of (a), thereafter (c) adding to the reaction mixture containing active manganese dioxide, a monohydric phenol having a member selected from the group consisting of hydrogen and chlorine in one of the positions ortho to the phenolic hydroxyl group in a quantity sufficient to cause the permanent disappearance of the color due to the free radical and (d) thereafter isolating the quinol ether from the soluiton.

2. The process of claim 1 wherein the phenol of (a) is 2,4,6-tri-t-butylphenol.
3. The process of claim 1 wherein the monohydric phenol of (c) is phenol.
4. The process of claim 1 wherein the monohydric phenol of (c) is 4-t-butylphenol.
5. The process of claim 1 wherein the monohydric phenol of (c) is 2,4,6-trichlorophenol.
6. The process of claim 1 wherein the monohydric phenol of (c) is pentachlorophenol.
7. The process of claim 1 wherein the monohydric phenol of (c) is 4-(phenylthio)phenol.
8. The process of claim 1 wherein the monohydric phenol of (c) is 4-methoxyphenol.
9. The process of claim 1 wherein the monohydric phenol of (c) is 4-benzoyloxyphenol.
10. The process of claim 1 wherein the monohydric phenol of (c) is 4-benzyloxyphenol.
11. The process of claim 1 wherein the monohydric phenol of (c) is 4-phenoxyphenol.
12. A 4 - aryloxy - 2,4,6 - tri - t - butyl - 2,5 - cyclohexadiene-1-one wherein the aryloxy group is selected from the group consisting of 4-(phenylthio)phenoxy, 4-benzoyloxyphenoxy, 4 - benzyloxyphenoxy and 4 - phenoxyphenoxy groups.
13. 4 - [4 - Phenylthio)phenoxy]-2,4,6-tri-t-butyl-2,5-cyclohexadiene-1-one.
14. 4 - (4 - Benzoyloxyphenoxy)-2,4,6-tri-t-butyl-2,5-cyclohexadiene-1-one.
15. 4 - (4 - Benzyloxyphenoxy) - 2,4,6 - tri-t-butyl - 2,5-cyclohexadiene-1-one.
16. 4 - (4 - Phenoxyphenoxy) - 2,4,6 - tri - t - butyl-2,5-cyclohexadiene-1-one.

References Cited

UNITED STATES PATENTS 3,281,435   10/1966   McNelis _____ 260—396

OTHER REFERENCES

Chemical Abstract, Muller et al., vol. 53 (1959), pp. 2142d–2143b relied on.

Chemical Abstract, Ley et al., vol. 52 (1958), page 10936 relied on.

LORRAINE A. WEINBERGER, *Primary Examiner.*

L. A. THAXTON, *Assistant Examiner.*